United States Patent [19]
Stouffer et al.

[11] Patent Number: 5,385,503
[45] Date of Patent: Jan. 31, 1995

[54] TEMPERATURE CONTROLLER AIR OUTLET

[75] Inventors: Ronald D. Stouffer, Silver Spring; Ernest W. Chesnutis, Jr., Columbia, both of Md.

[73] Assignee: Bowles Fluidics Corporation, Columbia, Md.

[21] Appl. No.: 982,646

[22] Filed: Dec. 1, 1992

[51] Int. Cl.[6] .................. B60H 1/34; F24F 13/08
[52] U.S. Cl. ...................... 454/153; 454/285
[58] Field of Search ............ 454/125, 127, 153, 285; 137/835

[56] References Cited

U.S. PATENT DOCUMENTS

| | | | |
|---|---|---|---|
| 3,745,906 | 7/1973 | Kakei et al. | 454/125 |
| 4,151,955 | 5/1979 | Stouffer | 137/835 X |
| 4,407,186 | 10/1983 | Izumi et al. | 454/153 |
| 4,437,392 | 3/1984 | Stouffer | 454/125 |
| 4,517,881 | 5/1985 | Stouffer | 454/125 |
| 4,774,975 | 10/1988 | Ayers et al. | 137/835 X |
| 5,099,753 | 3/1992 | Stouffer | 454/125 |

FOREIGN PATENT DOCUMENTS

101242  6/1982  Japan ...................... 454/153

*Primary Examiner*—Harold Joyce
*Attorney, Agent, or Firm*—Jim Zegeer

[57] ABSTRACT

Control of temperature of air efflux from an air outlet is by control of the oscillation of a fluidic oscillator. Directionality of efflux is by control of nibs at the outlet.

8 Claims, 4 Drawing Sheets

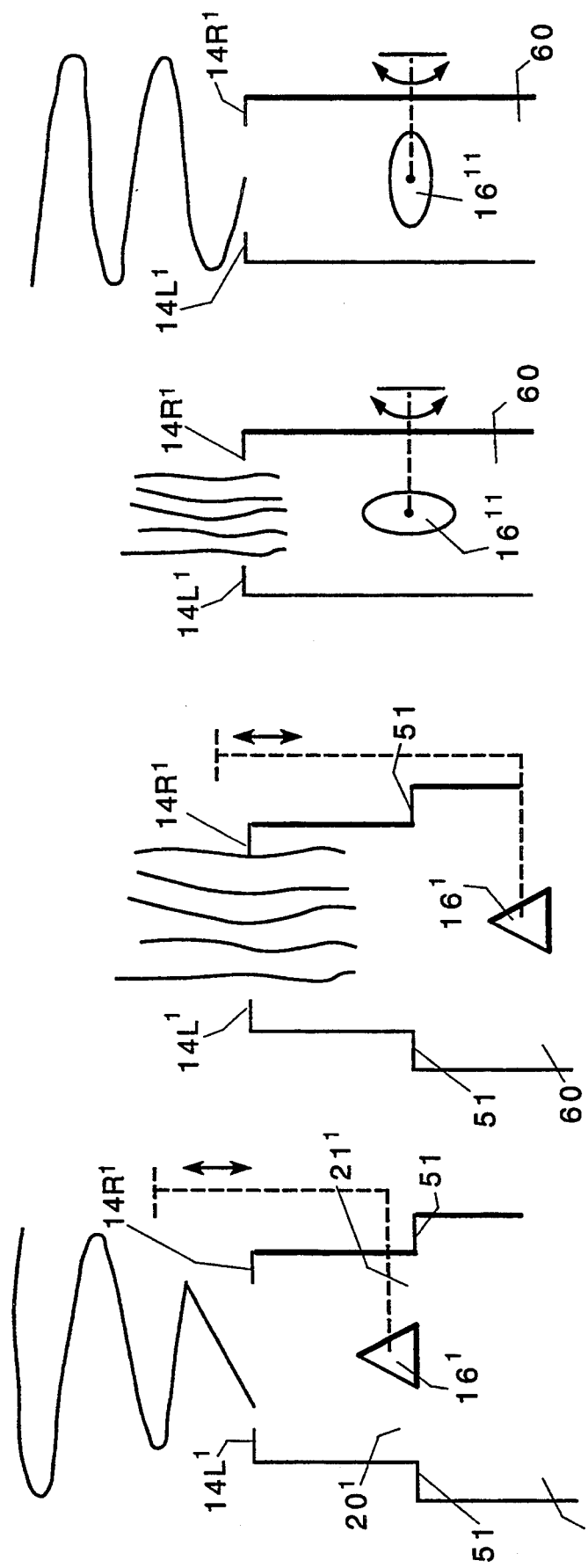

TEMPERATURE CONTROLLER AIR OUTLET

BACKGROUND AND BRIEF DESCRIPTION OF THE INVENTION

The present invention is directed to an air outlet structure and system, in which air temperature is controlled by mixing or pulsating control of the air flow and also to control the fan angle and directionality of the air flow vectors.

Fluidic oscillators for causing a sweeping or oscillatory movement of an air jet are well known in the art as is exemplified by the following prior patents: U.S. Pat. Nos. 5,099,753, 4,709,622, 4,694,992, 4,672,886 and 3,832,939, and there are many other examples.

In Stauffer U.S. Pat. No. 4,437,392 and Morris et al. U.S. Pat. No. 4,941,398, both owned by the assignee hereof, a flexible vane is oscillated by a moving air stream to impose a sweeping or fanshape to the output air stream.

An object of the present invention is to provide a temperature controller using a fluidic element. A further object of the invention is to provide a low cost temperature controller for issuing air (heated or cooled) into a living space such as a room or into the passenger compartment of a vehicle, such as a passenger car. A further object of the invention is to provide a controllable fluidic element. Still a further object of the invention is to provide a low cost remote control arrangement for controlling the oscillation or non-oscillation of a fluidic element.

In one preferred embodiment of the invention, an island oscillator element of the type disclosed in Stouffer U.S. Pat. No. 4,151,955 (incorporated herein by reference) is rendered non-oscillatory by translation of the island, or by shifting of a portion of the outlet structure relative to the island. In a further preferred embodiment, the oscillation or non-oscillation of an island oscillator is remotely controlled by a valve feeding pressurized air from upstream of the island to a position or point which precludes the formation of shed or Karman vortices and oscillatory action via an externally operable valve elements, respectively.

DESCRIPTION OF THE DRAWINGS

The above and other objects, advantages and features of the invention will become more apparent when considered with the following specification and accompanying drawings wherein:

FIGS. 4a and 4b illustrate a further preferred embodiment of the invention in which there is relative linear translation of the island relative to the source of heated or cooled air, FIGS. 5a and 5b illustrate a further embodiment wherein an island element is rotated between an oscillatory and non-oscillatory modes.

DETAILED DESCRIPTION OF THE INVENTION

The invention controls the temperature of the fluid afflux from heater and air-conditioning (A/C) outlets by controlling the oscillation of an oscillator, particularly, an island oscillator of the type disclosed in U.S. Pat. No. 4,151,955. An island oscillator is particularly advantageous in this invention because it has been found that the outlet temperatures can easily differ as much as 20 degrees between when it is oscillating and when oscillation is negated or the device rendered non-oscillatory. This is because the oscillatory mode produces thorough mixing with the ambient whereas the non-oscillatory mode produces much less mixing with ambient air. This premier or superior mixing is not limited to island oscillators; however, because of the ease of operation, simplicity of the geometry and meeting of minimum (small volumetric space) packaging requirements, the island-type oscillator is preferred.

Figure 1:
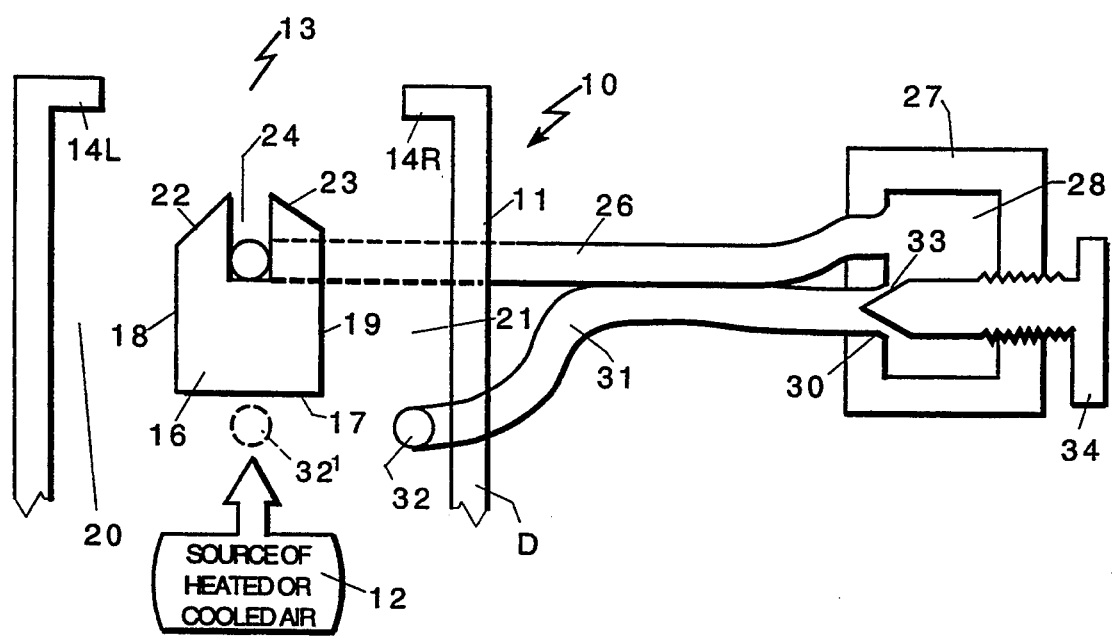
FIG. 1 is a schematic diagram of a preferred embodiment of the invention incorporating fluid remote control of the oscillation or non-oscillation of an island oscillator, FIGS. 2a and 2b diagrammatically illustrate the operation with the fluid remote control valve closed and open, respectively.

Referring now to FIG. 1, a temperature controllable air outlet 10 includes a housing or duct 11 coupled to a supply of air (heated or cooled) 12. While duct 11 is preferably rectangular or square in cross-section, round, oval or other shapes call be used. Transition sections from round to rectangular, etc. can be provided in the duct work 13.

Figures 6A, 6B, 6C:
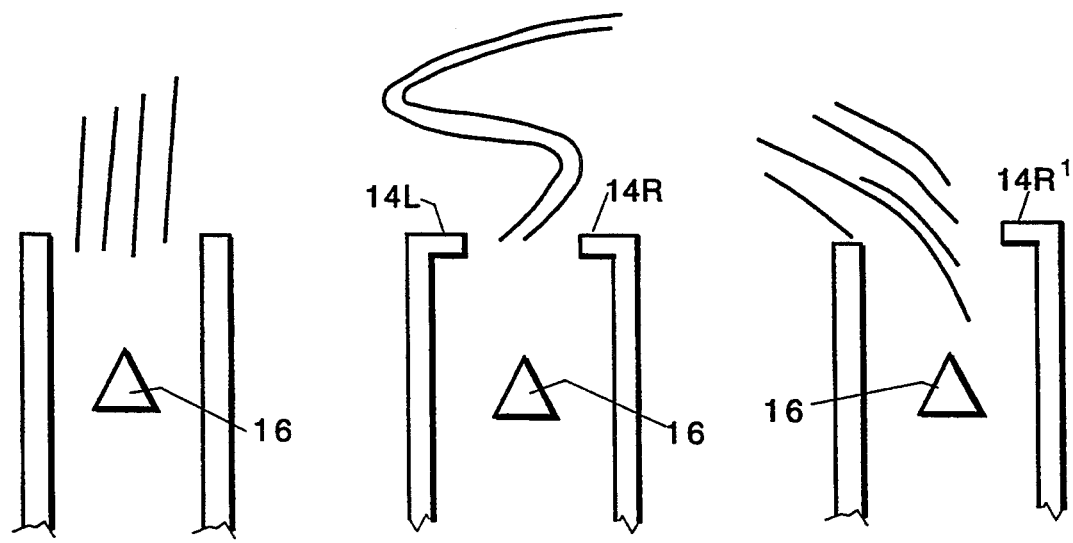
FIGS. 6a, 6b and 6c illustrate an island oscillator which is rendered non-oscillatory and oscillatory, respectively, by the absence or presence, respectively, of outlet nibs.

The effect of outlet nibs 14L and 14R are shown in FIG. 6(a), FIG. 6(b) and FIG. 6c. As shown, the small nibs 14L and 14R provide the necessary throat geometry to provide the proper confinement to the downstream section of the island to support oscillation. This is true when the island 16 is positioned close to the outlet. (See U.S. Pat. No. 4,155,955 for a fuller explanation.)

With only one nib, such as nib 14R, as shown in FIG. 6(c), the jet is turned to the left. In addition, the jet appears to be mixing better on the nib affected side.

Referring again to FIG. 1, an island member 16 has a base 17, parallel side wall surfaces 18 and 19, which form parallel passages 20 and 21. A pair of inwardly sloped wall surfaces 22, 23 are intersected by control element 24. Control element 24 is coupled by tube 26 to valve 27. Valve 27 has a chamber 28 in body member 29 and a valve seat 30 which is connected to tube 31 which leads to a source 32 of high pressure air just upstream of island 16. Valve member 33 has a control knob 34 so that the valve can be adjusted.

Figure 2A:
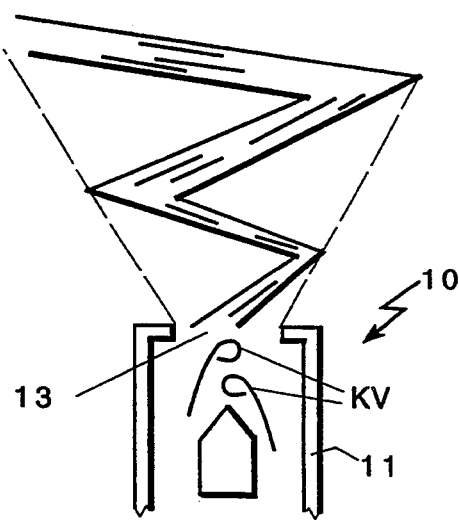
Figure 2B:
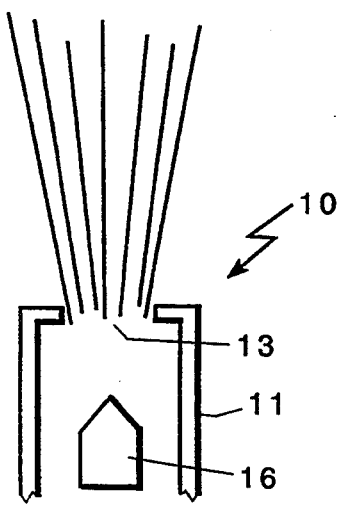

FIG. 2(a) and FIG. 2(b) illustrate the response to changes in the valve setting extremes. In FIG. 2(a) with the valve fully closed, the air through outlet 13 is oscillated with a wide fan angle and good mixing of air from source 12 with ambient air. Note the shed or Karman vortices KV. The jet temperature is modulated toward ambient. When valve 27 is open, the device is rendered non-oscillatory by virtue of the higher pressure air from upstream of island 16. The air issuing through outlet 13 has a narrow fan angle with little mixing and the temperature is modulated toward the jet temperature.

This configuration allows remote temperature control which does not require any additional energy. The temperature and focus control are gradual as valve 27 is operated from fully closed to fully open positions and vice versa.

Figure 3:
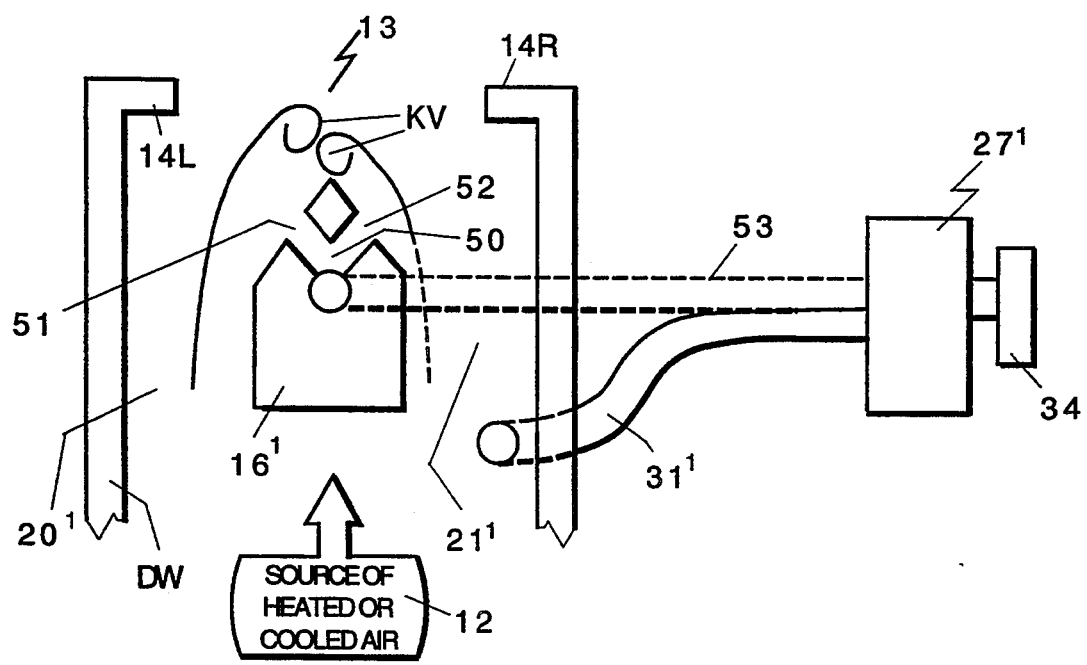
FIG. 3 is a schematic illustration of a further embodiment of the invention incorporating fluid remote control of an island.

A modification of the remote control is illustrated in FIG. 3. In this case, high pressure air is also used to control oscillation. In this case, island 16' is provided with a Y-shaped passage 50 having downstream ports 51 and 52 in surfaces 22, 23 connected by a tube 53 to a remotely located control valve 54. Closing the valve thereby preventing the flow of high pressure air permits normal oscillation (FIG. 2(a)) with good mixing and temperature moderated toward ambient valves.

Opening the valve 54 permits air flow, which progressively defeats oscillation to moderate the mixing and thus regulate the outlet temperature closer to the inlet.

Jet's or Stream's Temperature

In FIG. 4(a) and FIG. 4(b) are illustrated a physical linear translation of the island relative to duct 60. In FIG. 4(a), the island is in a position or mode to cause oscillation and is moved to a downstream position relative to constriction 51. The steady mode is shown in FIG. 4(b) wherein the island has been translated upstream of constriction 51. In FIGS. 5(a) and 5(b), the island is rotary relative to the duct. The primed numerals correspond to elements previously described.

Figure 7A:
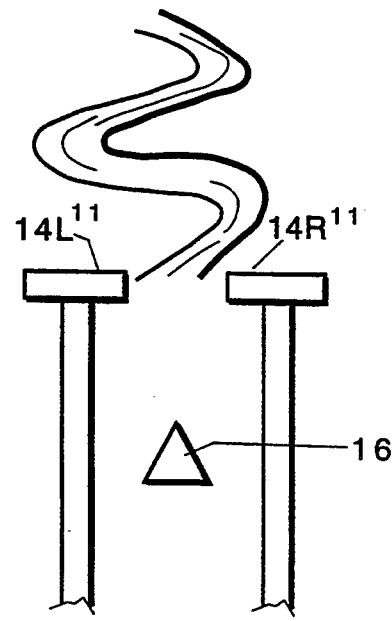
FIGS. 7a and 7b illustrate a further embodiment of the invention wherein the pressure behind the outlet nibs are vented to render the oscillator non-oscillatable.
Figure 8:
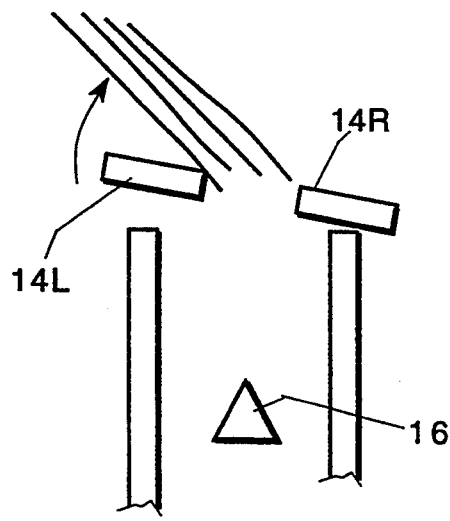
FIG. 8 illustrates a modification in which the outlet nibs are adjustable for directionality control.
Figure 9:
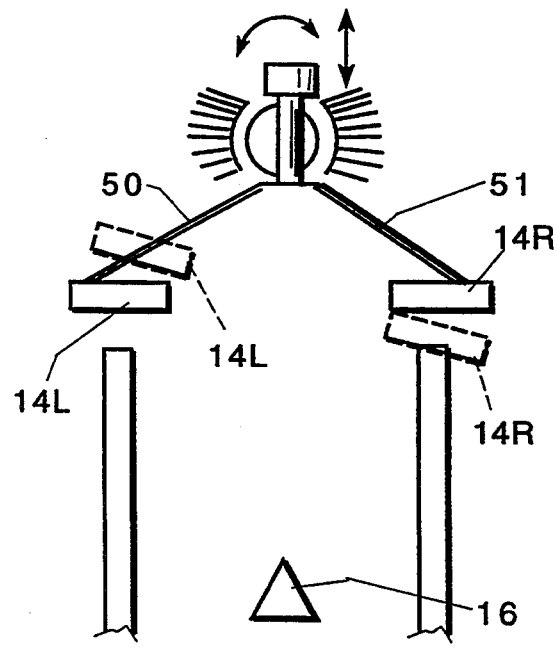
FIG. 9 illustrates a modification in which oscillatory/non-oscillatory states are combined with directionality control.

Other ways of controlling oscillation (and therefore the temperature) as well as integrating the temperature control with control of directionality of the jet is shown in FIGS. 7A, 8 and 9. In oscillators where nibs 14 (left and right) are necessary to support oscillation, the effect of the nibs can be defeated by venting the air immediately upstream of the nib to ambient. The normal oscillatory condition of the oscillator shown in FIG. 7a is defeated by lifting nibs 14L and 14R to provide a vent path or gap 14VPL and 14VPR. In addition, if the structure containing nibs 14L and 14R is pivoted so as to form a vent or gap on the left side, the jet will be deflected to the left as shown in FIG. 8, and to the right if one vent is formed on the right. This provides jet directionality control.

Figure 7B:
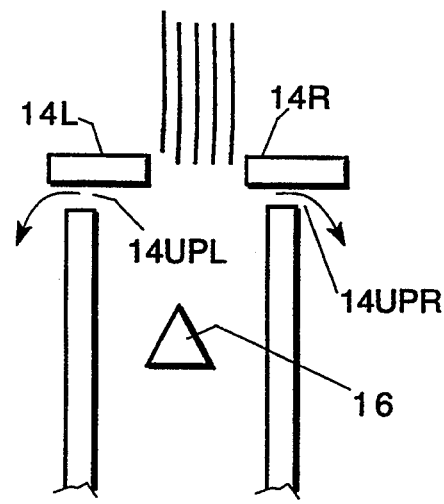

A nib carrying structure can be nutated about the exit of the oscillator to left and right jet deflection, up and down to create dual vents and allow the jet to exit as shown in FIG. 7b or with the nibs properly positioned to sustain oscillation as shown in FIG. 7a and, therefore, produce modulation of the temperature to the ambient value.

In FIG. 9, the nibs 14L and 14R are carried by frame members 50 and 51 which is coupled to central control members 51. A universal mounting ball 52 and socket joint 53 is carried on a threaded knob member 55, which is threadably engaged with ball 52. When the threaded knob member is rotated, the nibs are moved toward and away from an oscillatory and non-oscillatory positions, respectively. When in the non-oscillatory position, the left 14L or right 14R nib can be pivoted to prevent one or the other side of the outlet and deflect the jet accordingly.

While I have described and illustrated specific embodiments of the invention, it will be clear that variations of the details of construction which are specifically illustrated and described may be resorted to without departing from the true spirit and scope of the invention as defined in the appended claims.

What is claimed is:

1. A method for controlling the temperature of air efflux from a heated or cooled air outlet to ambient air, comprising:
    providing a controllable fluidic island oscillator in said air outlet, and
    controlling the oscillatory and non-oscillatory conditions of said island oscillator to moderate the mixing of said air flow through said outlet with ambient air and thus modulate said air efflux.

2. The method defined in claim 1 wherein said fluidic oscillator includes nibs at the sides of said outlet, and controlling the directionality of air vector issuing through said outlet during non-oscillatory time of said fluidic oscillatory by venting the space upstream of one of said nibs.

3. The method defined in claim 1 wherein said oscillator is an island oscillator having an island therein and the step of controlling includes translating the position of said island relative to said outlet.

4. A method for controlling the temperature of air efflux from a heated or cooled air outlet, comprising:
    providing a controllable fluidic oscillator in said air outlet, and
    controlling the oscillatory and non-oscillatory conditions of said oscillator, said oscillator being an island oscillator and said controlling the oscillatory and non-oscillatory conditions of said oscillator including the step of supplying high pressure air to a point on said island to terminate formation of Karman vortices thereabout.

5. Apparatus for controlling the temperature of air efflux from a heated or cooled air outlet, comprising:
    a controllable fluidic island oscillator in said air outlet, and
    means for controlling the oscillatory and non-oscillatory conditions of said island oscillator to moderate the mixing of said air efflux with ambient air and thus modulate said air efflux.

6. The invention defined in claim 5 wherein said fluidic oscillator is an island oscillator having nibs at the sides of said outlet, and means for controlling the directionality of air vector issuing through said outlet during non-oscillatory time of said fluidic oscillatory by venting the space upstream of one of said nibs, respectively.

7. The invention defined in claim 5 wherein said oscillator is an island oscillator having an island therein and said means for controlling includes means translating the position of said island relative to said outlet.

8. Apparatus for controlling the temperature of air efflux from a heated or cooled air outlet, comprising:
    a controllable fluidic oscillator in said air outlet, and
    means for controlling the oscillatory and non-oscillatory conditions of said oscillator, said oscillator being an island oscillator and said means for controlling including means for supplying high pressure air to a point on said island to terminate oscillation.

* * * * *